United States Patent [19]

Borzym

[11] Patent Number: 5,005,692

[45] Date of Patent: * Apr. 9, 1991

[54] TUBE FEED APPARATUS

[76] Inventor: John J. Borzym, 4820 Schoolbell, Birmingham, Mich. 48010

[*] Notice: The portion of the term of this patent subsequent to Feb. 27, 2007 has been disclaimed.

[21] Appl. No.: 437,864

[22] Filed: Nov. 16, 1989

Related U.S. Application Data

[63] Continuation of Ser. No. 149,430, Jan. 29, 1988, Pat. No. 4,903,822.

[51] Int. Cl.⁵ ............................................. B65G 29/00
[52] U.S. Cl. .................................. 198/624; 414/746.7
[58] Field of Search ................................ 198/624, 813;
271/272–274; 414/745.1, 746.7; 226/176, 177,
186, 187, 189; 83/422, 436; 144/242 C, 246 R,
246 A, 247

[56] References Cited

U.S. PATENT DOCUMENTS

| | | |
|---|---|---|
| 1,481,886 | 1/1924 | Berg . |
| 2,169,394 | 8/1939 | Richardson . |
| 3,371,770 | 3/1968 | Graham et al. ..................... 198/624 |
| 3,400,807 | 8/1968 | Nickla . |
| 4,508,213 | 4/1985 | Kelley . |
| 4,903,822 | 2/1990 | Borzym ............................. 198/624 |
| 4,907,632 | 3/1990 | Reuter ............................. 144/246 R |

Primary Examiner—Joseph E. Valenza
Attorney, Agent, or Firm—Dykema Gossett

[57] ABSTRACT

A feed apparatus for tubing in which a pair of arms are mounted in scissors fashion and a feed roller and drivingly connected pulley are mounted at each free end of each arm. An endless drive belt is trained around the pulleys and a motor drivingly engages the belt so as to drive the pulleys and thereby the feed rollers. As the arms move in scissors fashion to move the feed rollers into and out of driving engagement with the tubing, the length of the path of the drive belt is shortened but a belt tensioning mechanism operates to compensatingly increase the length of the belt path to maintain a constant tension on the belt and thereby a constant drive to the feed rollers. The tensioning mechanism includes an air cylinder and a tensioning roller secured to the free end of the pistion rod of the air cylinder. A constant air pressure is maintained in the air cylinder so that the tensioning roller is automatically moved outwardly or inwardly to maintain a constant tension on the drive belt as the feed rollers move toward or away from the tubing.

12 Claims, 4 Drawing Sheets

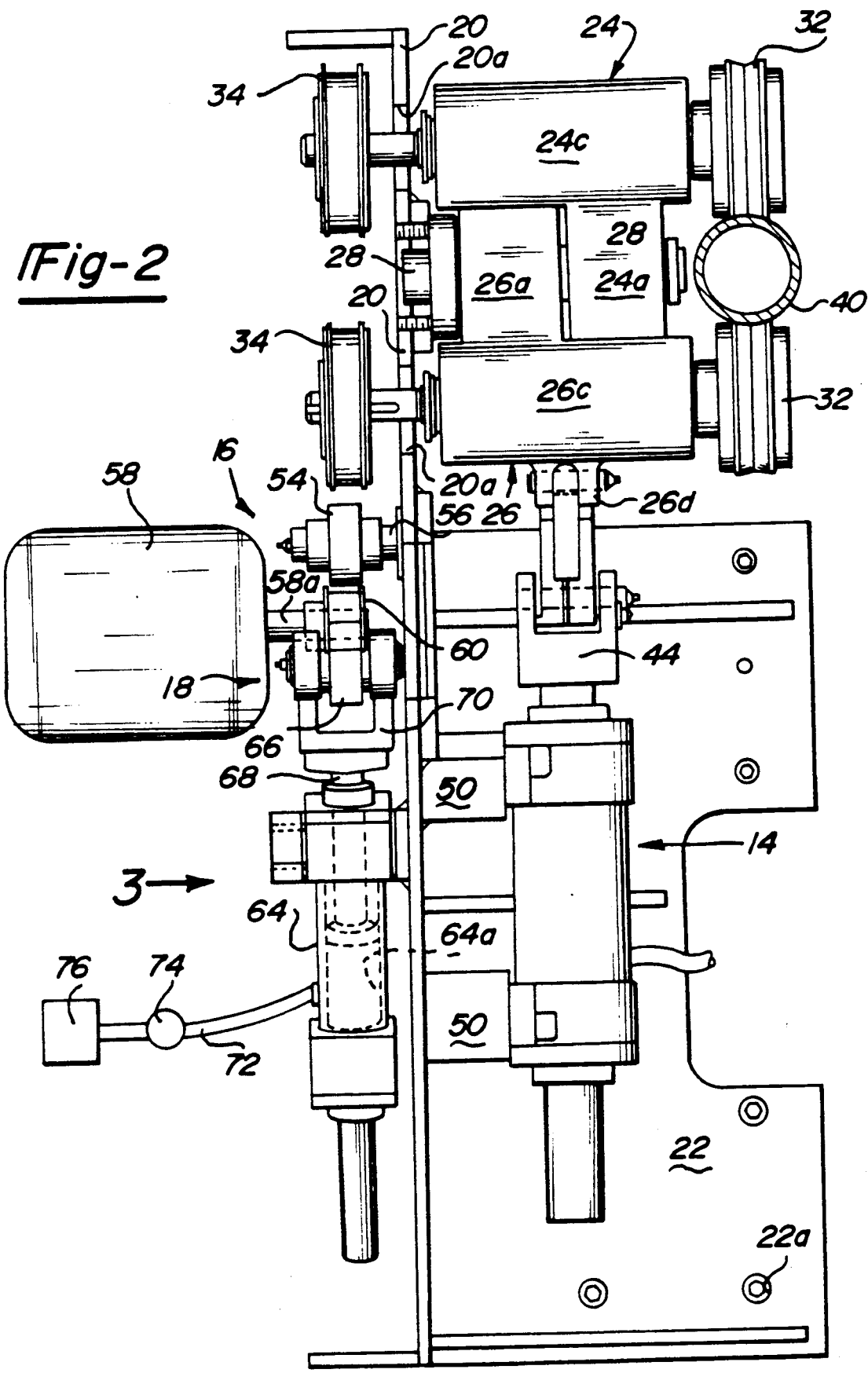

TUBE FEED APPARATUS

This is a continuation of co-pending application Ser. No. 149,430 filed on Jan. 29, 1988, now U.S. Pat. No. 4,903,822.

BACKGROUND OF THE INVENTION

This invention relates to a power feed apparatus for linearly advancing an elongate workpiece, and more particularly relates to a power feed apparatus for linearly advancing cut lengths of tubing to a cut-off apparatus which severs successive lengths of the tubing.

Various types of apparatus are commonly used in industrial applications for advancing a workpiece toward or away from an operating station. For example, in connection with tube severing operations in which successive sections of a length of tubing are cut to a desired size, the tubing is axially fed toward a tube cut-off machine which typically includes a press operated cut-off unit. The cut-off unit includes a pair of jaws which grip the tube and a knife which severs the clamped tubing. A mechanical feed apparatus is normally provided to feed the tubing to the cut-off unit.

Prior art tube feeding mechanisms consist of a number of movable mechanical parts, such as mechanically driven rollers which engage the sides of the tubing and coact to selectively move the tubing toward the cut-off unit for severing of the successive lengths of the tubing.

The prior art power feed systems are either relatively simple in construction but generally unreliable or inefficient in operation, or are reliable and efficient in operation but only at the price of a complex design which is high in initial cost and which requires considerable maintenance.

SUMMARY OF THE INVENTION

This application is directed to the provision of a power feed apparatus for tubing which is simple in construction and yet positive and reliable in operation.

The power feed apparatus according to the invention includes a pair of feed rollers adapted to drive the tubing along a tube feed path; means for moving the rollers relative to each other between a drive position engaging opposite sides of the tubing and a rest position withdrawn from the tubing feed path; means for rotationally driving the rollers and including a drive belt having a path of movement that varies in length in response to relative movement of the feed rollers; and belt tensioning means operative in response to relative movement of the rollers to vary the length of the belt path in compensation for the variations in belt path length resulting from the relative movement of the feed rollers. The belt tensioning means thus operates to maintain a relatively constant path length and thereby a relatively constant belt tension so that a positive drive is maintained to the feed rollers at all times.

According to a further feature of the invention, the apparatus further includes a pulley mounted in driving relation to each of the feed rollers and the drive belt is trained around the pulleys. This arrangement provides a compact and convenient means of driving the feed roller.

According to a further feature of the invention, the belt tensioning means includes a tensioning roller engaging the drive belt and means maintaining a constant pressure on the tensioning roller. This arrangement provides a simple and efficient means of maintaining a predetermined tension on the drive belt to thereby ensure that a positive drive is maintained to the feed rollers at all times.

According to a further feature of the invention, the pressure maintaining means includes a power cylinder having a piston rod and a pressure chamber acting on the piston rod and means for maintaining a constant pressure in the pressure chamber; and the tensioning roller is mounted on the free end of the piston rod. This arrangement provides a simple and commercially available apparatus for readily maintaining the required tension on the drive belt.

According to a further feature of the invention, the apparatus includes a pair of arms mounted for movement about a fixed pivot axis and each defining a free end; the feed rollers are respectively mounted on the free ends of the arms; a pulley is mounted on the free end of each of the arms in driving relation to the respective feed roller; and the drive belt is trained around the pulleys. This arrangement provides a ready and efficient means for providing relative movement of the feed rollers while yet maintaining a positive drive to the feed rollers at all times.

According to a further feature of the invention, each of the arms is mounted on the fixed axis at a point intermediate the ends of the respective arms so as to define two free ends on each of the arms; a feed roller and a pulley, in driving relation, are mounted on each free end of each arm; and the drive belt is trained around all of the pulleys so as to drive all of the feed rollers. This arrangement enables two pairs of feed rollers to be moved into driving engagement with the tubing and maintains a positive drive to all of the feed rollers at all times.

According to a further feature of the invention, the means for relatively moving the feed rollers includes power means operative to move the arms in scissors fashion so as to move the feed rollers toward and away from each other between their drive and rest positions. This arrangement provides a precise and efficient mechanism for moving the feed rollers into and out of their drive positions.

According to a further feature of the invention, the power means for moving the feed rollers includes a power cylinder including a piston rod and means interconnecting the free end of the piston rod to the arms. In the disclosed embodiment cf the invention, the interconnecting means comprises a pair of drive links connected at one end to the free end of the piston rod and respectively connected at their other ends to the arms. This arrangement provides compact and efficient mechanical linkage for moving the feed rollers between their drive and rest positions.

BRIEF DESCRIPTION OF THE DRAWINGS

FIG. 2 is an end elevational view of the invention tube feed apparatus;

DETAILED DESCRIPTION OF THE PREFERRED EMBODIMENT

Figure 1:
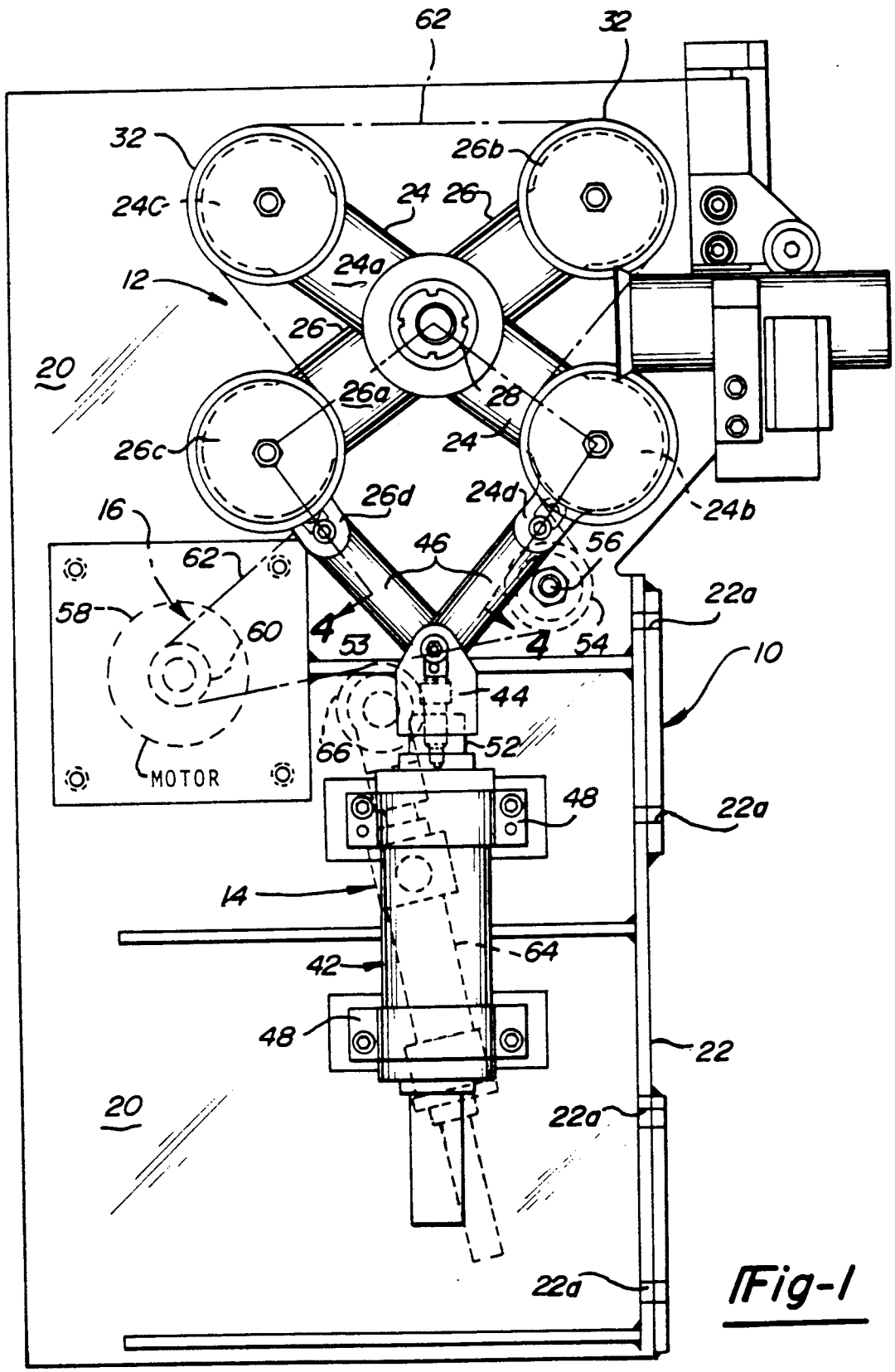
FIG. 1 is a side elevational view of the invention tube feed apparatus.
Figure 4:
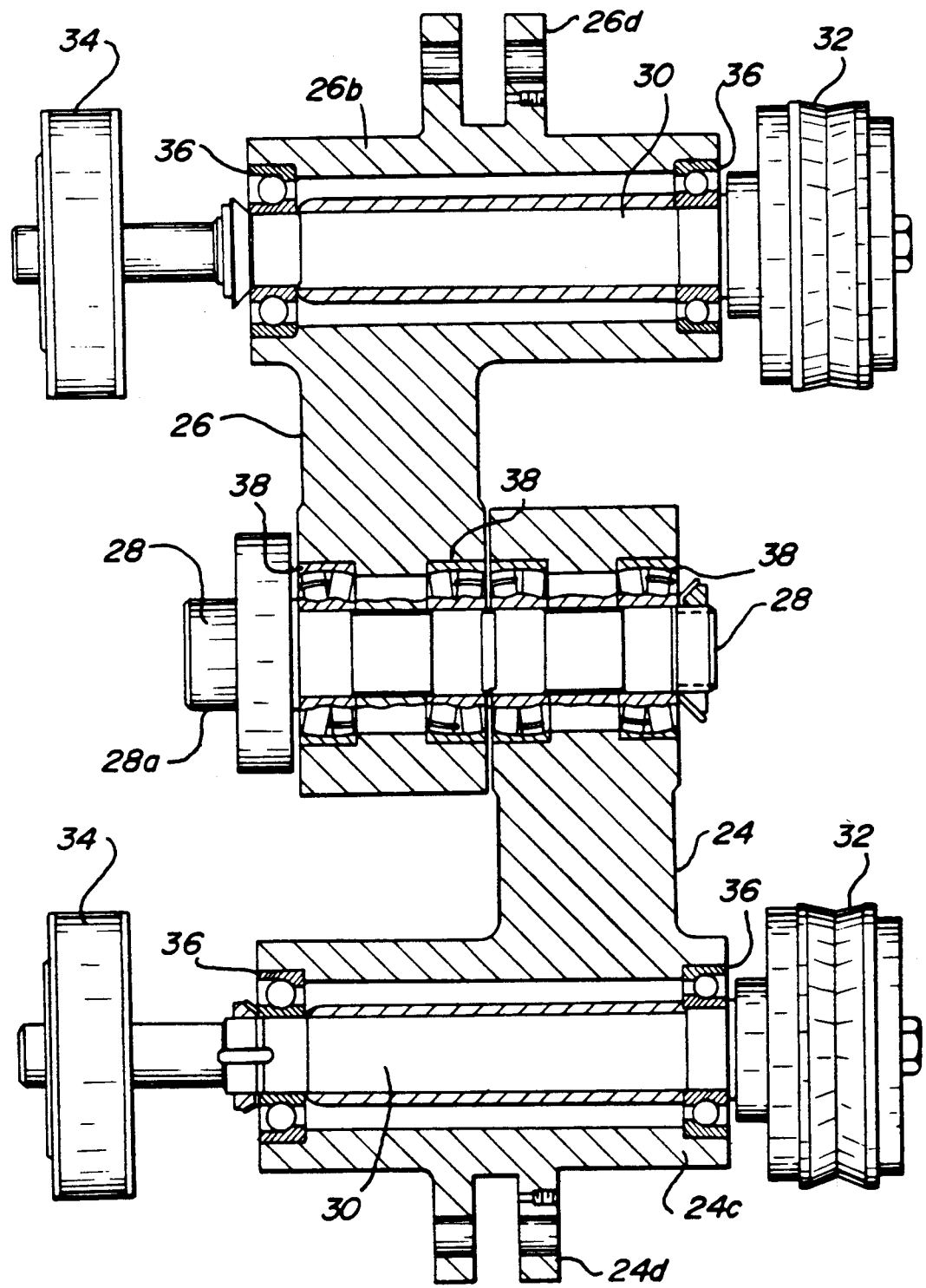
FIG. 4 is a cross-sectional view taken on line 4—4 of FIG. 1.
Figure 3:
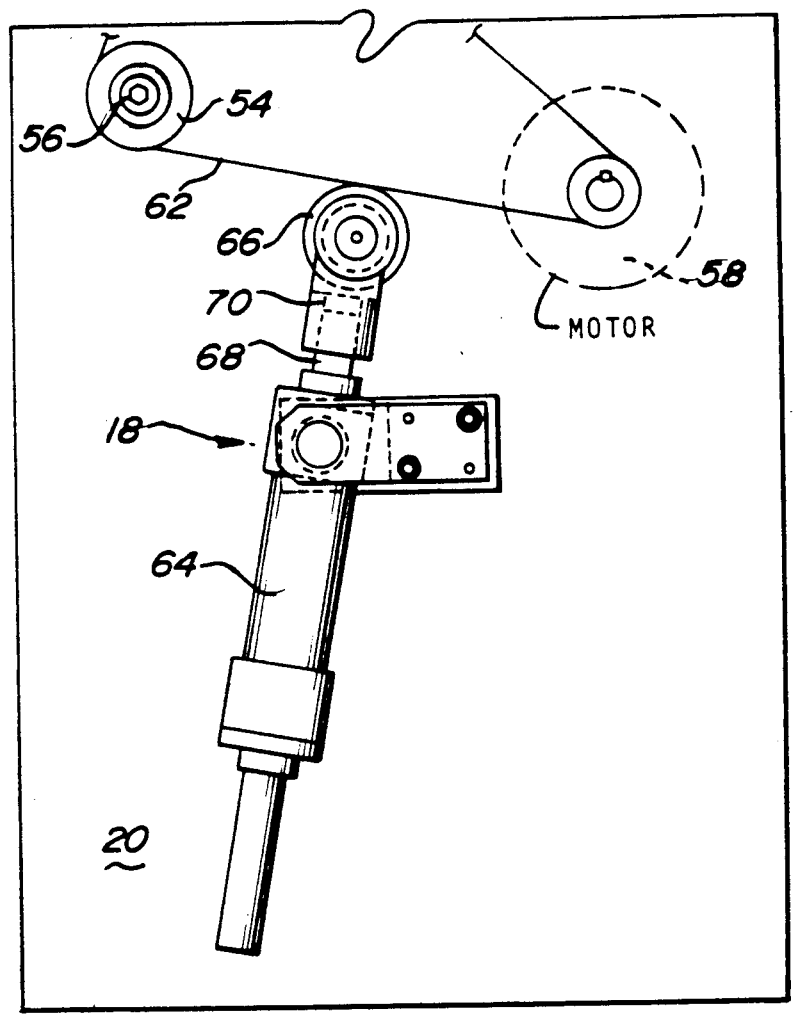
FIG. 3 is a view looking in the direction of the arrow 3 in FIG. 2.
Figure 5:
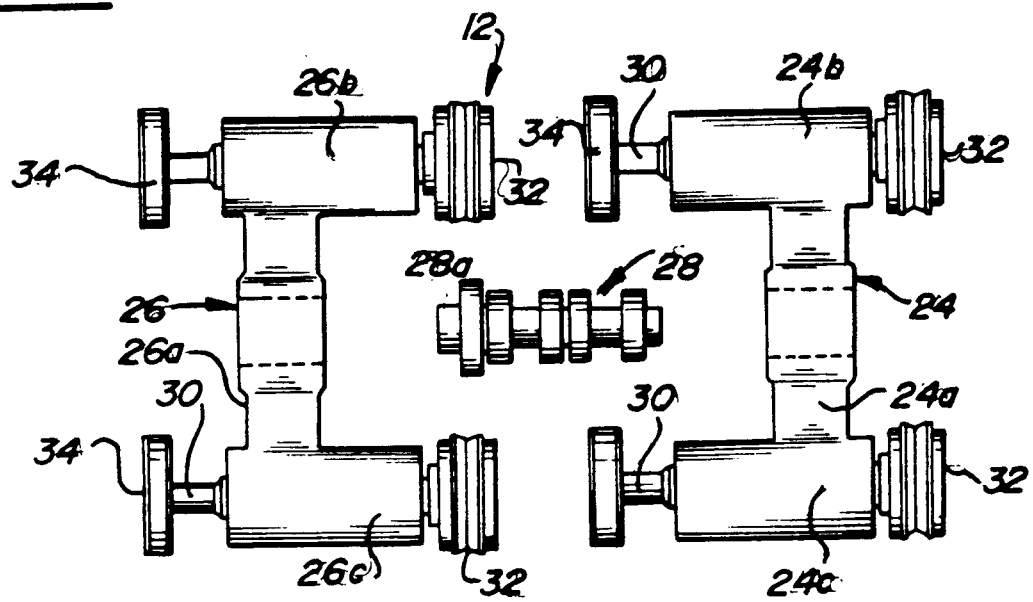
FIG. 5 is an exploded view of an arm assembly employed in the invention tube feed apparatus.

The invention feed apparatus, broadly considered, comprises a frame 10, an arm assembly 12, an actuator assembly 14, a feed roller drive assembly 16, and a belt tensioning assembly 18.

Frame assembly 10 is formed of suitable steel plate stock and includes a main body vertical plate member 20 and a mounting plate member 22 secured to and positioned at right angles with respect to main body vertical plate 20 and including mounting holes 22a for securing the frame structure to an associated foundation structure.

Arm assembly 12 includes a first arm member 24, a second arm member 26, a pivot shaft 28, drive shafts 30, feed rollers 32, and pulleys 34.

Arm members 24 and 26 are mirror images, one of the other, and each include a main body arm portion 24a,26a, a first tubular end portion 24b,26b and a second tubular end portion 24c,26c.

Drive shafts 30 are respectively journalled in arm end portions 24b, 24c, 26b, 26c by bearing members 36 and each have a drive roller 32 drivingly secured to one end thereof and a pulley 34 drivingly secured to the other end thereof so that rotation of a pulley 34 drives the associated driver roller 32. Arm members 24 and 26 are pivotally mounted intermediate their ends by pivot shaft 28 which is journalled in the arm members by bearings 38 and which is rigidly secured at its end 28a to frame main body plate 20 to define a fixed horizontal pivot axis for arms 24,26. The ends of the shafts 30 adjacent pulleys 34 pass through suitable slots 20a in frame plate 20 to dispose pulleys 34 on the opposite side of plate 20 from the arms 24,26 and from feed rollers 32.

It will be seen that with arms 24 and 26 pivotally mounted intermediate their ends to frame plate 20 by pivot pin 28, and with shafts 30 passing through slots 20a in frame plate 20, the arms are able to undergo relative pivotal movement about the axis of shaft 28, in scissors fashion, to respectively move the opposed pairs of feed rollers toward and away from each other and into and out of driving engagement with a tube 40.

Actuator assembly 14 includes an air cylinder 42, a yoke 44, and a pair of drive links 46.

Cylinder 42 is secured to frame plate 20 by brackets 48 bolted to spacer blocks 50 to position air cylinder 42 in parallel spaced relation to main body frame plate 20.

Yoke 44 is secured to the upper end of the piston rod 52 of cylinder 42 and drive links are pivotally mounted at their lower ends to yoke 44 by a pivot pin 53 and pivotally mounted at their respective upper ends to clevises 24d and 26d formed integrally with end portion 24b of arm 24 and end portion 26c of arm 26 so that reciprocal movement of piston rod 52 operates to move arms 24,26 in scissors fashion through the intermediary of drive links 46 to thereby move feed rollers 32 into and out of driving engagement with tubing 40.

Roller drive assembly 16 includes an idler pulley 54 journalled on a shaft 56 secured to frame plate 20; an electric motor 58 suitably secured (by means not shown) to frame structure 10 and including an output drive shaft 58a; a drive pulley 60 secured to the free end of motor output shaft 58a; and a drive belt 62 trained successively around the four drive rollers 32, around idler pulley 54, and around motor drive pulley 60 in endless fashion so that energization of motor 60 serve to drive belt 62 to in turn rotate pulleys 34 and thereby drive feed rollers 32 so as to linearly drive tubing 40 positioned between the feed rollers 32 with the feed rollers in their drive positions with respect to the tubing.

Belt tensioning assembly 18 includes an air cylinder 64 and a tensioning roller 66.

Air cylinder 64 includes a pressure chamber 64a, a piston rod 68, and a clevis 70 secured to the free end of the piston rod. Tensioning roller 66 engages the underside of belt 62 between idler pulley 54 and motor drive pulley 60. A conduit 72 connects pressure chamber 64a of air cylinder 64 to a pressure regulator 74 which in turn communicates with a source of pressurized air 76.

In the operation of the invention feed apparatus, actuator assembly 14 is selectively actuated to move feed rollers 32 between their rest positions, withdrawn from the tube feed path, and their drive positions, engaging opposite sides of the tubing. As the arms 24,26 are moved by the actuating mechanism 14 in scissors fashion to move the feed rollers between their rest and drive positions, the length of the path traversed by drive belt 62 varies but this variation is compensated by the action of belt tensioning means 18 which acts to take up the slack in the belt and maintain a predetermined amount of tension in the belt so as to thereby maintain a positive drive to rollers 32 at all times. Specifically, as the feed rollers are moved from their rest to their drive position, the length of the belt path around the pulleys 34, idler pulley 54, and motor drive pulley 60 is shortened. However, since tensioning roller 66 is pressed against the underside of belt 62 with a constant pressure as determined by the setting of pressure regulator 74, air cylinder 64 extends in response to movement of the feed rollers toward their drive position to lengthen the path of the belt between idler pulley 54 and motor drive pulley 60 by an amount to compensate for the change in the length of the remainder of the belt path caused by the movement of the feed rollers to their drive positions so that the belt path is maintained at a constant length to thereby maintain a constant tension in the belt and thereby ensure that a positive drive is provided to the feed rollers at all times.

The invention feed apparatus will be seen to provide a simple and effective apparatus for positively driving tubing or other elongate material along a feed path. Specifically, the invention belt tensioning assembly enables a simple scissors construction to be employed to move the feed rollers into and out of their drive position with respect to the tubing without interrupting the smooth drive to the feed rollers.

Whereas a preferred embodiment has been illustrated and described in detail, it will be apparent that various changes may be made in the disclosed embodiment without departing from the scope or spirit of the invention.

I claim:

1. A power feed apparatus for tubing or the like comprising:

feed rollers adapted to drive the tubing along a tube feed path;

actuator means, including means interconnecting said rollers for joint displacement, operative in response to actuation of said actuator means to simultaneously and jointly displace said rollers between a drive position in which the rollers are disposed at opposite sides of and proximate said feed path to drivingly engage opposite sides of the tubing with each of said rollers having its axis of rotation spaced the same distance from the center line of said tube regardless of the diameter of said tube and a rest position in which each of the rollers is withdrawn form its drive position and withdrawn from said feed path;

means for rotationally driving said rollers throughout the movement of said rollers between engaged and withdrawn positions such that various tube diameters can be driven;

said means for relatively moving said rollers includes a pair of arms mounted for movement about a fixed pivot axis with said pair of arms each defining a free end;

said feed rollers are respectively mounted on the free ends of said arms;

a pulley is mounted on the free end of each of said arms in driving relation to the respective feed rollers; and an endless member is trained around said pulleys.

2. A feed apparatus according to claim 1 wherein:
said means for rotationally driving said rollers includes a flexible endless drive member having a path of movement that varies in length in response to relative movement of said feed rollers.

3. A feed apparatus according to claim 2 wherein:
said endless member comprises a drive belt;
said apparatus further including a pulley mounted in driving relation to each feed roller; and
said belt is trained around said pulleys.

4. The feed apparatus according to claim 2, further including a tensioning means operative in response to relative movement of said rollers to vary the length of said endless member path in compensation for the variation and endless member path length resulting from said joint displacement of said feed rollers so as to maintain a relatively constant endless member path length and thereby a relatively constant endless member tension.

5. A feed apparatus according to claim 2 wherein:
said tensioning means includes a tensioning roller engaging said endless member and means maintaining a constant pressure on said tensioning roller and thereby on said endless member.

6. A feed apparatus according to claim 5 wherein:
said pressure maintaining means includes a power cylinder having a piston rod and a pressure chamber acting on said piston rod and means for maintaining a constant pressure in said pressure chamber; and said tensioning roller is mounted on the free end of said piston rod.

7. A feed apparatus according to claim 1, wherein:
each of said arms is mounted on said fixed axis at a point intermediate the ends of the respective arms so as to define a further free end of each arm;
a feed roller and a pulley, in driving relation, are mounted on the further free end of each arm; and
said endless member is trained around all of said pulleys so as to drive all of said feed rollers.

8. A feed apparatus according to claim 7, wherein:
said means for relatively moving said rollers further includes power means operative to move said arms in scissors fashion so as to move said feed rollers toward and away from each other between their drive and rest positions.

9. A feed apparatus according to claim 8 wherein:
said power means includes a power cylinder including a piston rod and means interconnecting the free end of said piston rod to said arms.

10. A power feed apparatus for tubing or the like comprising:
a pair at least of feed rollers adapted to drive said tubing along a tube feed path;
means for moving said rollers relative to each other between a drive position engaging opposite sides of the tubing and a rest position withdrawn from the tubing feed path, said means for relatively moving including a pair of arms mounted on a fixed axis at a point intermediate the ends of the respective arms to define opposed free ends on each arm;
said feed rollers respectively mounted on at least one free end of each said arm;
means for rotationally driving said rollers.

11. A feed apparatus according to claim 10 wherein:
said means for relatively moving said rollers further includes power means operative to move said arms in scissors fashion so as to move said feed rollers toward and away from each other between their drive and rest positions with each of said rollers having its axis of rotation spaced the same distance from the center line of said tube regardless of the diameter of said tube.

12. A feed apparatus according to claim 11, wherein:
said power means includes a power cylinder including a piston rod and interconnecting means comprising a pair of drive links connected at one end to the free end of said piston rod and respectively connected at their other ends to said arms.

* * * * *